March 9, 1965     T. C. WALDROP     3,172,799
WIRE SPACING JIG AND METHOD
Filed Oct. 11, 1961
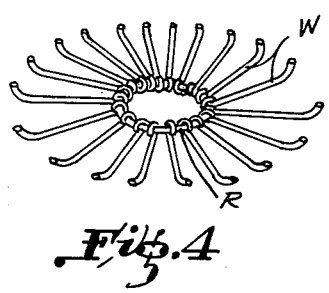
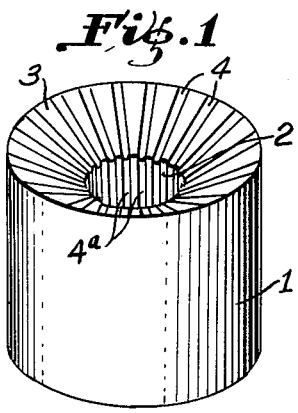
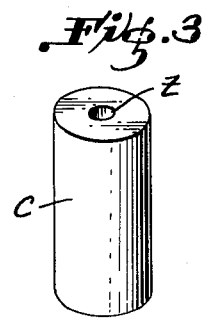
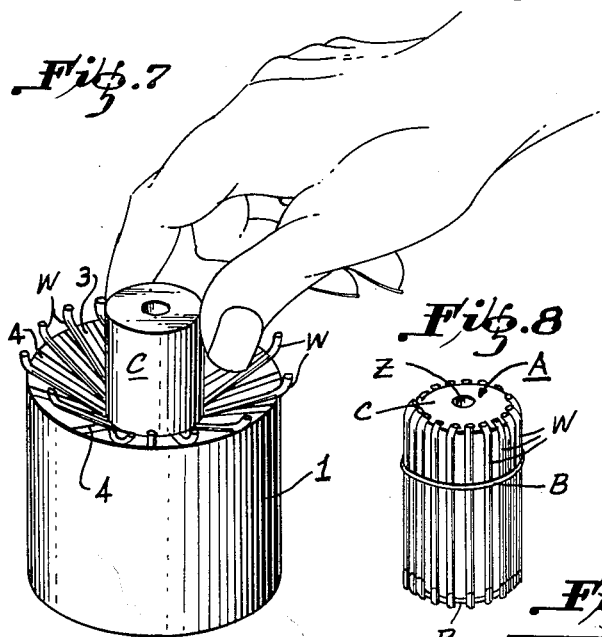
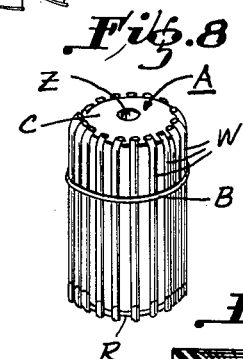
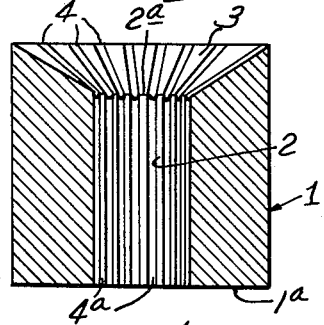
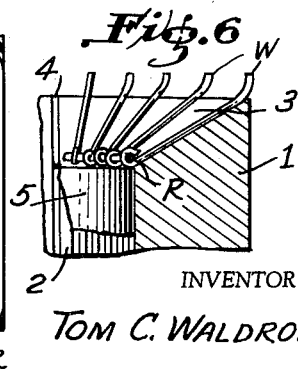
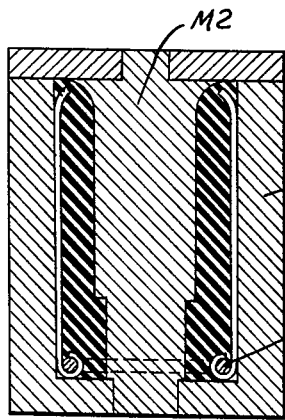
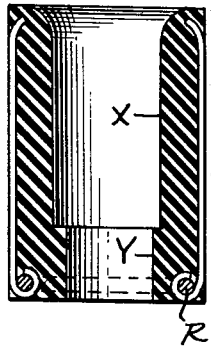
INVENTOR
Tom C. Waldrop
BY Alexander & Dowell
ATTORNEY

United States Patent Office 3,172,799
Patented Mar. 9, 1965

3,172,799
WIRE SPACING JIG AND METHOD
Tom C. Waldrop, Arlington, Tex., assignor to Empire Rubber Co., Grapevine, Tex., a corporation of Texas
Filed Oct. 11, 1961, Ser. No. 144,417
3 Claims. (Cl. 156—475)

This invention relates to an improved method and apparatus for making a wire-reinforced swab cup, and more particularly relates to an improved method and apparatus for associating the individual wires of a wire reinforcement cage with an extruded uncured rubber load to form a composite mold charge assembly which is then entered into a mold where the rubber is flowed around the wire cage members and finally cured and bonded thereto.

The general type of swab cup which is made according to the present process has in the past been made by assembling reinforcement wires around an uncured rubber load by hand, and then holding the assembly together while inserting it into the mold. The word "rubber" as used in this disclosure is intended to include both natural rubber and synthetic rubbers, such as neoprene, and other moldable rubber-like materials. Since in a completed swab cup the longitudinally disposed reinforcement wires are tangent to the outer surface of the rubber cup and embedded flush therewith, the barrel of the mold is cylindrical and usually does not include any grooves or other means for accurately locating the wires equally spaced around the circumference of the mold and parallel with the axis of the swab cup assembly during molding.

It is therefore a principal object of this invention to provide a novel and improved method and apparatus for placing the wire members on an uncured rubber load in such a way that the wires are equally spaced therearound and positioned thereon parallel with the axis of the load in preparation for insertion of the composite assembly into the mold for final shaping and curing.

Another object of the invention is to provide an assembly fixture in which the wire cage members and the uncured rubber load are fed in at one end and come out properly assembled at the other end so that the fixture can be conveniently used in a straight-line continuous manufacturing process by passing the extruded material through the fixture toward the mold, that is with the materials always moving in the same direction instead of reversing their motion.

Other objects and advantages of the invention will become apparent during the following discussion of the drawing, wherein:

FIG. 1 is a perspective view of an assembly fixture for use in connection with the process of the present invention;

FIG. 2 is a perspective view of a metal plug adapted to be inserted into the bore of the fixture shown in FIG. 1;

FIG. 3 is a perspective view of an uncured rubber extrusion prior to assembly;

FIG. 4 is a perspective view of the wire reinforcement cage prior to assembly;

FIG. 5 is a longitudinal cross-sectional view through the fixture of FIG. 1;

FIG. 6 is an enlarged fragmentary cross-sectional view taken through a fixture according to FIG. 1, but showing the plug of FIG. 2 in place in the bore through the fixture and supporting a wire cage prior to insertion of the rubber blank, the plug preventing the wire cage from dropping through the fixture before the rubber blank can be pushed into engagement therewith;

FIG. 7 is a perspective view showing the rubber extrusion being pushed through the fixture and showing the wire members of the cage beginning to fold upwardly and inwardly around the rubber extrusion;

FIG. 8 is a perspective view of a composite assembly including reinforcement wires assembled to and properly spaced around the uncured rubber load after the latter has been pushed through the fixture;

FIG. 9 is a longitudinal sectional view taken through a conventional mold and showing the mold in closed position after an assembly according to FIG. 8 has been inserted therein; and FIG. 10 is a cross-sectional view taken through a completed swab cup after it has been assembled according to the present process as illustrated in FIG. 7 and cured in the mold shown in FIG. 9.

Referring now in detail to the figures of the drawing, the device which is used to apply the wire cage of FIG. 4 to the uncured rubber extrusion C of FIG. 3 comprises a cylindrical fixture 1 having a bore 2 therethrough and having a conically flared upper face 3. The length of the fixture of the bore 2 is approximately as long as the axial length of a finished composite cup assembly including wires W and a rubber load C. A plurality of slots 4 begin at the upper end of the conical face 3 of the fixture and extend downwardly as shown at 4a within the bore 2 through the fixture. The slots are arcuate in cross-section and their depth is equal to or slightly less than the diameter of a wire W of the reinforcement cage, each cage comprising a plurality of wire members W captivated upon an annular ring R. The diameter of the longitudinal bore 2 is such that the rubber load C can pass freely therethrough while at the same time driving the wires W and the ring R downwardly in the manner illustrated in FIG. 7, and out through the bottom of the fixture 1.

Thus, a composite assembly is formed, FIG. 8, in which each of the wires W is precisely spaced circumferentially of the rubber load C and in which this rubber load is disposed within the wire cage above the ring R. The composite assembly A formed in this manner can be conveniently held together by a rubber band B passing therearound, although such support may not be necessary due to the tackiness of the rubber load C and the fact that the wires are pressed snugly thereagainst.

It is to be noted that in the finished swab cup as shown in FIG. 10 the swab cup has an enlarged bore comprising an upper bore X and a lower bore Y, both of which are of much greater diameter than the small bore Z of the original extruded rubber load C. The small bore Z is enlarged by the mandrel M2 of the mold, and the rubber which is displaced outwardly by the mandrel M2, shown in FIG. 9, flows between the wires W and also flows downwardly around and below the reinforcement ring R, the amount of rubber in the rubber load C having been accurately predetermined so as to precisely fill the mold M between the barrel portion M1 and the mandrel M2. This feature will be more fully discussed in connection with the process described below.

An additional member of the apparatus comprises the plug 5 which is of such diameter as to pass freely into the bore 2 of the fixture 1. By reference to FIG. 6 it will be seen that the plug 5 is initially inserted into the bore 2 and that when so inserted it lies just below the angular line 2a, FIG. 5, at which the bore 2 joins the flared face 3. The plug 5, when inserted into the bore 2, serves the purpose of supporting the members of the reinforcement cage including the wires W and the ring R in the position shown in FIG. 6 before the rubber load C is passed downwardly through the bore 2, as shown in FIG. 7. If the plug 5 were not used, the wires W of the cup might immediately pivot about the ring R and permit the latter to drop down through the bore 2 before the rubber load C was brought into place. On the other hand, if the eyes in the lower ends of the wires W are crimped tightly enough about the ring R, the plug 5 might be eliminated.

However, such tight crimping has the disadvantage of making it more difficult to quickly position the entire cage in the slots 4 of the flared upper face 5.

Referring now to the method according to the present invention, this method not only applied the reinforcement wires to the rubber properly oriented thereon, but also facilitates and minimizes handling of the hot sticky rubber load. The plug shown in FIG. 2 is first inserted into the bore 2 of the fixture 1, as shown in FIG. 6, and is allowed to drop down and lie with its bottom flush with the bottom surface 1a of the fixture, FIG. 5. Then the reinforcement cage including the wires W and the ring R, FIG. 4, is placed as shown in FIG. 6 with the wires lying respectively in the slots 4 of the flared face 3 of the fixture.

Then when this placement of the wires has been accomplished as shown in FIG. 6, the rubber load C is pushed downwardly through the bore 2 so as to displace the plug 5 downwardly therein and pivot the wires upwardly and inwardly to lie against the outer cylindrical face of the rubber load C as shown in FIG. 8. Thus, the rubber load, the wires W, the reinforcement ring R, and the plug 5 are all displaced downwardly through the bore 2 and recovered at the lower end thereof. This displacement can be accomplished either by pushing the rubber load C through bore 2 by hand, as illustrated in FIG. 7, or alternatively this step can be accomplished by machine elements, not illustrated in the present disclosure.

Whether done by hand or by machinery, the present assembling method and apparatus comprises a large practical advance in the art over the former manner of manually assembling the wires W on the rubber load C and attempting to properly space the wires annularly therearound and at the same time keep all of the wires precisely parallel with the axis of the rubber load. One of the principal difficulties encountered in hand assembling is that the rubber C as it is emitted from an extruder (not shown) is hot and sticky and therefore very difficult to manage while attempting to properly position the reinforcement wires W by hand about the cylindrical surface of the rubber load.

It is also to be understood that the wires W and the ring R are completely cleaned, as by sand blasting, and are then coated with a suitable primer before they are assembled to the rubber load C, so that after they are assembled and vulcanized they will be properly bonded to the rubber load C. The steps involved in closing the mold shown in FIG. 9 and in heat-curing the rubber are well known in the prior art and are therefore not further described in the present disclosure.

I do not limit my invention to the exact form shown in the drawing, for obviously changes may be made therein within the scope of the following claims.

I claim:

1. Apparatus for applying a reinforcement cage including a plurality of wires each having one end captivated by a central ring to a cylindrical rubber load, comprising a fixture body having a bore therethrough of diameter no smaller than the outside diameter of said central ring, the body having a cage-receiving face at one end of the bore opening outwardly therefrom, and the face having a plurality of slots equally spaced around its surface in planes including the axis of the bore and each slot extending into and through the bore, the slots each being no greater in depth than the diameter of a reinforcement wire.

2. In apparatus as set forth in claim 1, said face being conically flared outwardly from the bore.

3. In apparatus as set forth in claim 1, a plug slidable in said bore and of length approximately equal to the axial length thereof, the plug being entered in the bore to prevent the wire cage from falling therethrough until pushed through by a rubber load.

References Cited in the file of this patent
UNITED STATES PATENTS

| | | |
|---|---|---|
| 2,276,321 | Lindahl | Mar. 17, 1942 |
| 2,305,282 | Taylor et al. | Dec. 15, 1942 |
| 2,385,055 | Breslove | Sept. 18, 1945 |
| 2,523,924 | Sawyer | Sept. 26, 1950 |
| 2,720,003 | Harris et al. | Oct. 11, 1955 |
| 2,989,657 | Sampson | June 20, 1961 |
| 2,995,782 | Heller | Aug. 15, 1961 |
| 3,004,298 | Haynie | Oct. 17, 1961 |
| 3,028,665 | Hirst | Apr. 10, 1962 |
| 3,052,585 | Anderson | Sept. 4, 1962 |
| 3,066,399 | Saunders | Dec. 4, 1962 |
| 3,067,501 | Baumann et al. | Dec. 11, 1962 |
| 3,090,115 | Carr | May 21, 1963 |